(12) United States Patent
Wang et al.

(10) Patent No.: US 11,137,908 B2
(45) Date of Patent: Oct. 5, 2021

(54) KEYBOARD OPERATION WITH HEAD-MOUNTED DEVICE

(71) Applicant: Apple Inc., Cupertino, CA (US)

(72) Inventors: Paul X. Wang, Cupertino, CA (US); Keith J. Hendren, San Francisco, CA (US); Alex J. Lehmann, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/818,951

(22) Filed: Mar. 13, 2020

(65) Prior Publication Data

US 2020/0326847 A1    Oct. 15, 2020

Related U.S. Application Data

(60) Provisional application No. 62/834,175, filed on Apr. 15, 2019.

(51) Int. Cl.
*G06F 3/0488* (2013.01)
*G02B 27/01* (2006.01)
*G06F 3/0481* (2013.01)

(52) U.S. Cl.
CPC ....... *G06F 3/04886* (2013.01); *G02B 27/017* (2013.01); *G06F 3/04815* (2013.01); *G02B 2027/0138* (2013.01); *G02B 2027/0174* (2013.01)

(58) Field of Classification Search
CPC ............ G06F 3/04886; G06F 3/04815; G06F 3/011–3/015; G02B 27/017; G02B 2027/0138; G02B 2027/0174
See application file for complete search history.

(56) References Cited

U.S. PATENT DOCUMENTS

| 2010/0156836 A1* | 6/2010 | Katayama | G06F 3/042 345/173 |
| 2011/0138285 A1* | 6/2011 | Kuo | G06F 3/167 715/727 |
| 2011/0227820 A1 | 9/2011 | Haddick et al. | |

(Continued)

FOREIGN PATENT DOCUMENTS

JP    H 10-133840    5/1998

*Primary Examiner* — Stephen G Sherman
(74) *Attorney, Agent, or Firm* — Morgan, Lewis & Bockius LLP

(57) ABSTRACT

The operation of a keyboard, another input device, and/or any surface can be enhanced by features of a head-mounted device, which can display feedback, outputs, or other features based on the user's actions. For example, the head-mounted device can display text generated by the user's operation of the keyboard. The text can be displayed in a manner that allows a user to readily see the keyboard, the user's hands, and the text that is generated by operation of the keyboard. The head-mounted device can further display features that facilitate the user's operation of the keyboard. For example, suggested text, keystrokes, or other features correlated with keys of the keyboard can be displayed for selection by a user. By further example, the keyboard can be displayed in a position and orientation that conforms to an arrangement of the user's hands within a field of view of the head-mounted device.

16 Claims, 7 Drawing Sheets

(56) References Cited

U.S. PATENT DOCUMENTS

| | | | |
|---|---|---|---|
| 2012/0133496 A1* | 5/2012 | Aono | G06F 3/0414 340/407.2 |
| 2013/0046544 A1* | 2/2013 | Kay | G06F 16/3322 704/275 |
| 2013/0275907 A1 | 10/2013 | Lau et al. | |
| 2015/0227222 A1* | 8/2015 | Sako | G06F 3/017 345/173 |
| 2017/0083104 A1* | 3/2017 | Namba | G02B 27/017 |

\* cited by examiner

KEYBOARD OPERATION WITH HEAD-MOUNTED DEVICE

CROSS-REFERENCE TO RELATED APPLICATION

This application claims the benefit of U.S. Provisional Application No. 62/834,175, entitled "KEYBOARD OPERATION WITH HEAD-MOUNTED DEVICE," filed Apr. 15, 2019, the entirety of which is incorporated herein by reference.

TECHNICAL FIELD

The present description relates generally to head-mounted devices, and, more particularly, to operation of a keyboard with a head-mounted device.

BACKGROUND

A head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device. Other outputs provided by the head-mounted device can include audio output and/or haptic feedback. A user may further interact with the head-mounted device by providing inputs for processing by one or more components of the head-mounted device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that are managed by the components (e.g., sensors, circuitry, and other hardware) included with the wearable device. While a head-mounted device can provide outputs to a user in a variety of ways, it can also be helpful to allow a head-mounted device to receive inputs from a user. A head-mounted device as described herein can provide a user experience that is immersive while allowing the user to interact with the system in a manner that is natural, familiar, and intuitive.

A keyboard is an example of an input device that is familiar to many computer users. The use of a head-mounted device can keep a user's hands free to operate a keyboard or another device in a manner that is similar to the use of a keyboard. The operation of a keyboard, another input device, and/or any surface can be enhanced by features of the head-mounted device, which can display feedback, outputs, or other features based on the use of the keyboard. For example, the head-mounted device can display text generated by the user's operation of the keyboard. The text can be displayed in a manner that allows a user to readily see the keyboard, the user's hands, and the text that is generated by operation of the keyboard. The head-mounted device can further display features that facilitate the user's operation of the keyboard. For example, suggested text, keystrokes, or other features correlated with keys of the keyboard can be displayed for selection by a user. By further example, the keyboard can be displayed in a position and orientation that conforms to an arrangement of the user's hands within a field of view of the head-mounted device.

These and other embodiments are discussed below with reference to FIGS. 1-14. However, those skilled in the art will readily appreciate that the detailed description given herein with respect to these Figures is for explanatory purposes only and should not be construed as limiting.

Figure 1:
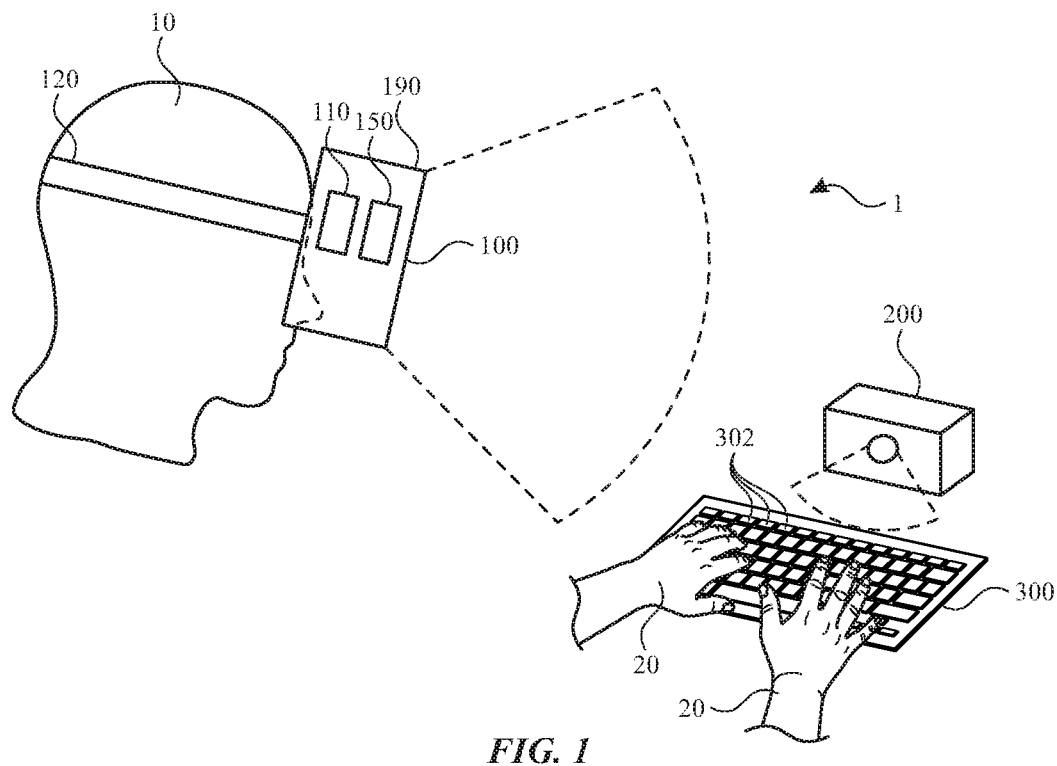
FIG. 1 illustrates a view of a head-mounted device and a keyboard in use, according to some embodiments of the present disclosure.

According to some embodiments, for example as shown in FIG. 1, a head-mounted device 100 includes a frame 190 that is worn on a head of a user. The frame 190 can be positioned in front of the eyes of a user to provide information within a field of view of the user. The frame 190 can provide nose pads or another feature to rest on a user's nose. The frame 190 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mounted device 100 to a user's head. For example, one or more bands, straps, belts, caps, hats, or other components can be used in addition to or in place of the illustrated components of the head-mounted device 100. By further example, the securement element 120 can include multiple components to engage a user's head.

The frame 190 can provide structure around a peripheral region thereof to support any internal components of the frame 190 in their assembled position. For example, the frame 190 can enclose and support various internal components (including for example integrated circuit chips, processors, memory devices and other circuitry) to provide computing and functional operations for the head-mounted device 100, as discussed further herein. Any number of components can be included within and/or on the frame 190 and/or the securement element 120 and be operably connected to each other.

The frame 190 can include and/or support one or more cameras 150. The cameras 150 can be positioned on or near an outer side of the frame 190 to capture images of views external to the head-mounted device 100. The captured images can be used for display to the user or stored for any other purpose.

A display 110 can optionally transmit light from a physical environment for viewing by the user. Such a display 110 can include optical properties, such lenses for vision correction based on incoming light from the physical environment. Additionally or alternatively, a display 110 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, the head-mounted device 100 of a system 1 can be used in conjunction with an input device such as a keyboard 300. The user can observe the keyboard 300 or a representation thereof through the display 110 of the head-mounted device. The display can include an image and/or other representation of the keyboard 300, the keys 302, and/or the hands 20. It will be understood that the keyboard can be or include a traditional keyboard with keys for corresponding alpha and/or numeric inputs. It will be understood that other types of keyboards are contemplated, such as number pads, phone dial pads, security code entry pads, custom key pads, and the like.

The user's hands 20 can be applied to the keys 302 of the keyboard 300 as an indication of text (e.g., characters, numbers, symbols, etc.) selected by the user 10. The operation of the keys 302 can produce text that is received, displayed, stored, and/or transmitted by the head-mounted device 100. The head-mounted device 100 can operate the camera 150 in a manner that captures one or more views of the keyboard 300 and/or the hands 20 within a field of view of the camera 150. The captured images can be produced on the display 110 of the head-mounted device 100 for observation by the user 10. As used herein, a camera is a device that can optically capture a view of an environment (e.g., within and/or outside the visible spectrum of light).

Contact and/or forces applied by a user can be detected by one or more components of the system 1. The operation of the keys 302 by the hands 20 of the user 10 can be communicated to the head-mounted device 100 in one or more of a variety of ways.

For example, the keyboard 300 can be operatively connected to the head-mounted device 100, such that operation of the keys 302 generate signals that are transmitted from the keyboard 300 to the head-mounted device 100. Such communication can be achieved along a wired and/or wireless interface between the keyboard 300 and the head-mounted device 100. By further example, one or more intermediate devices can be provided to facilitate one-way or two-way communication between the keyboard 300 and the head-mounted device 100.

By further example, the head-mounted device 100 can detect operation of the keys 302 with the user's hands 20 based on the views captured by the camera 150 of the head-mounted device 100. For example, the location of the hands 20 relative to the keyboard 300 and the keys 302 can be observed optically. By further example, motion of the fingers of the hands 20 and or motion of the keys 302 when pressed can be detected by the camera 150 or another device.

By further example, the operation of the keys 302 of the keyboard 300 by the user's hands 20 can be detected at least in part by a tracking device 200. For example, as shown in FIG. 1, the tracking device 200 can be placed in close proximity to the keyboard 300 to track motion of the user's hands 20 and/or the keys 302 of the keyboard 300 during operation. The tracking device 200 can be in communication with the head-mounted device 100 such that detections by the tracking device 200 can generate signals that are transmitted from the tracking device 200 to the head-mounted device 100. Such communication can be achieved along a wired and/or wireless interface between the tracking device 200 and the head-mounted device 100. By further example, one or more intermediate devices can be provided to facilitate one-way or two-way communication between the tracking device 200 and the head-mounted device 100. Additionally or alternatively, the tracking device 200 can be in contact with or coupled to the user's hands 20 to facilitate detections. For example, the tracking device 200 can include one or more components that are worn by the users hands to detect when the user moves relative to and/or applies a force to another object. Such components can include an inertial measurement unit ("IMU") that provides information regarding a characteristic of hands and/or fingers, such as inertial angles thereof. For example, the IMU can include a six-degrees of freedom IMU that calculates the position, velocity, and/or acceleration based on six degrees of freedom (x, y, z, $\theta_x$, $\theta_y$, and $\theta_z$). Such components can also include force detection, such as a force between fingers and a surface and/or other deformation or actions that result from applied forces. Additionally or alternatively, the user can wear gloves or another item that enhances imaging by the camera of the head-mounted device for detection of hand motions.

It will be understood that combinations of the above can be provided such that operation of the keyboard 300 is detected based on multiple detections. For example, the head-mounted device 100 can operate independently and/or based on signals from a tracking device 200 and/or a keyboard 300. Where no signals from the keyboard 300 are required, the keyboard 300 can provide the structure of a conventional keyboard layout without any electronics that would generate signals in response to operation of the keys 302. As such, the keyboard 300 can provide a user with reference for the location of the keys 302 without requiring any electronics within the keyboard 300 that would respond to the operation of the keys 302. Additionally, the keyboard 300 can be compact, portable, and/or collapsible to facilitate transportation and storage thereof.

Figure 2:
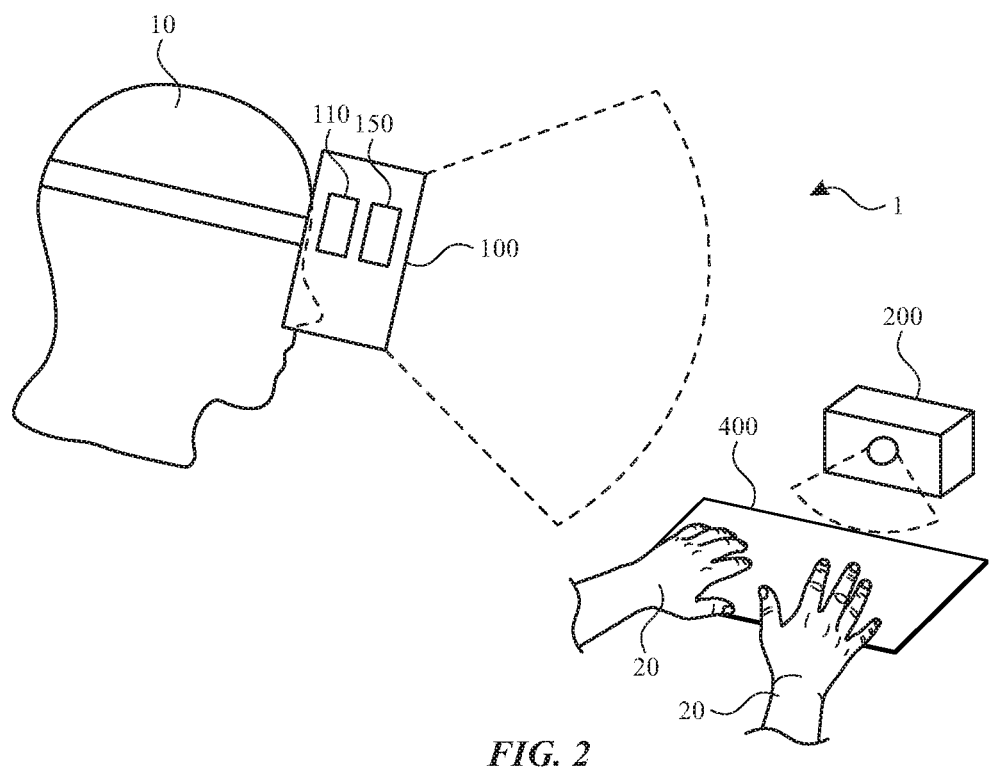
FIG. 2 illustrates a view of a head-mounted device and an input device in use, according to some embodiments of the present disclosure.

Referring now to FIG. 2, the head-mounted device 100 can be used in conjunction with another input device, such as input device 400. The input device 400 may lack some or all of the keys 302 illustrated as part of the keyboard 300. For example, the input device 400 can provide a touch-sensitive surface that receives tactile inputs from a user. The user can observe the input device 400 through the display 110 of the head-mounted device. The display can include keys (e.g., virtual keys) that are displayed at a location on the input device 400 when observed through the display 110. The user's hands 20 can operate the input device 400 by pressing on regions of a surface thereof. Such contact and/or forces can be detected by one or more components of the system 1. The input device 400 can further provide haptic feedback in response to touch inputs from the user's hands 20. For example, the input device 400 can provide haptic feedback in a region of user input as an acknowledgement that an input has been received.

For example, the input device 400 can be operatively connected to the head-mounted device 100, such that operation of the input device 400 generates signals that are transmitted from the input device 400 to the head-mounted device 100. Such communication can be achieved along a wired and/or wireless interface between the input device 400 and the head-mounted device 100. By further example, one or more intermediate devices can be provided to facilitate one-way or two-way communication between the input device 400 and the head-mounted device 100.

By further example, the head-mounted device 100 can detect operation of the input device 400 with the user's hands 20 based on the views captured by the camera 150 of the head-mounted device 100. For example, the location of the hands 20 relative to the input device 400 can be observed optically. By further example, motion of the fingers of the hands 20 and or motion of the regions of the input device 400 when pressed can be detected by the camera 150.

By further example, the operation of the input device 400 by the user's hands 20 can be detected at least in part by the tracking device 200. For example, as shown in FIG. 2, the tracking device 200 can be placed in close proximity to the input device 400 to track motion of the user's hands 20 and/or the surface regions of the input device 400 during operation. The tracking device 200 can be in communication with the head-mounted device 100 such that detections by the tracking device 200 can generate signals that are transmitted from the tracking device 200 to the head-mounted device 100, as discussed above.

It will be understood that combinations of the above can be provided such that operation of the input device 400 is detected based on multiple detections. For example, the head-mounted device 100 can operate independently and/or based on signals from a tracking device 200 and/or an input device 400.

Figure 3:
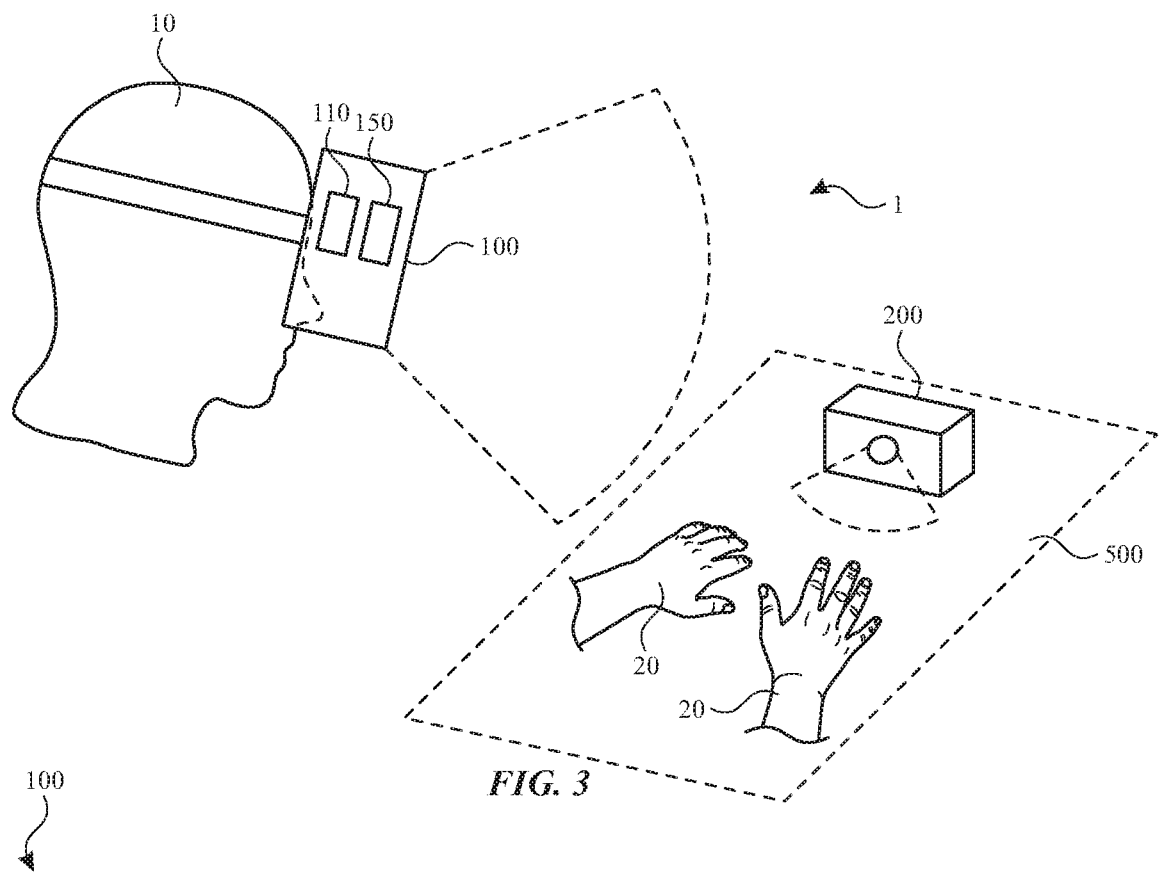
FIG. 3 illustrates a view of a head-mounted device and a surface in use, according to some embodiments of the present disclosure.

Referring now to FIG. 3, the head-mounted device 100 can be used in conjunction with a surface 500. The surface can be the surface of any object with which the user can interact, such as a table, desk, wall, or other surface. The user can observe the surface 500 through the display 110 of the head-mounted device. The display can include keys (e.g., virtual keys) that are displayed at a location on the surface 500 when observed through the display 110, as discussed further herein.

Contact and/or forces applied to the surface 500 can be detected by one or more components of the system 1. For example, the head-mounted device 100 can detect motion of the user's hands 20 with respect to the surface 500 based on the views captured by the camera 150 of the head-mounted device 100. For example, the location of the hands 20 relative to the surface 500 can be observed optically.

By further example, the operation of the surface 500 by the user's hands 20 can be detected at least in part by the tracking device 200. For example, as shown in FIG. 3, the tracking device 200 can be placed in close proximity to the surface 500 to track motion of the user's hands 20 during operation. The tracking device 200 can be in communication with the head-mounted device 100 such that detections by the tracking device 200 can generate signals that are transmitted from the tracking device 200 to the head-mounted device 100, as discussed above.

The keyboard 300, the input device 400, and/or the surface 500 can be stationary or mobile during use. For example, the keyboard 300, the input device 400, and/or the surface 500 can have a fixed or adjustable location and/or orientation with respect to an external environment, the user 10, and/or the head-mounted device 100. The keyboard 300, the input device 400, and/or the surface 500 can be mobile to accommodate a user's movements. Such mobility can be automated and facilitate for example by a vehicle (e.g., drone).

The user 10 can interact with the keyboard 300, the input device 400, and/or the surface 500 in a variety of ways. For example, the user can provides inputs by typing as if on a conventional keyboard by pressing keys. It will be appreciated that other inputs are contemplated, such as handwriting (e.g., with a finger, a stylus, or another device), drawing, and/or speech. Such inputs can be recognized and/or received by the head-mounted device 100, which can then perform the actions described herein.

It will be understood that combinations of the above can be provided such that operation of the input device 400 is detected based on multiple detections. For example, the head-mounted device 100 can operate independently and/or based on signals from a tracking device 200. Such combinations can enhance the accuracy and/or efficiency of detections.

Figure 4:
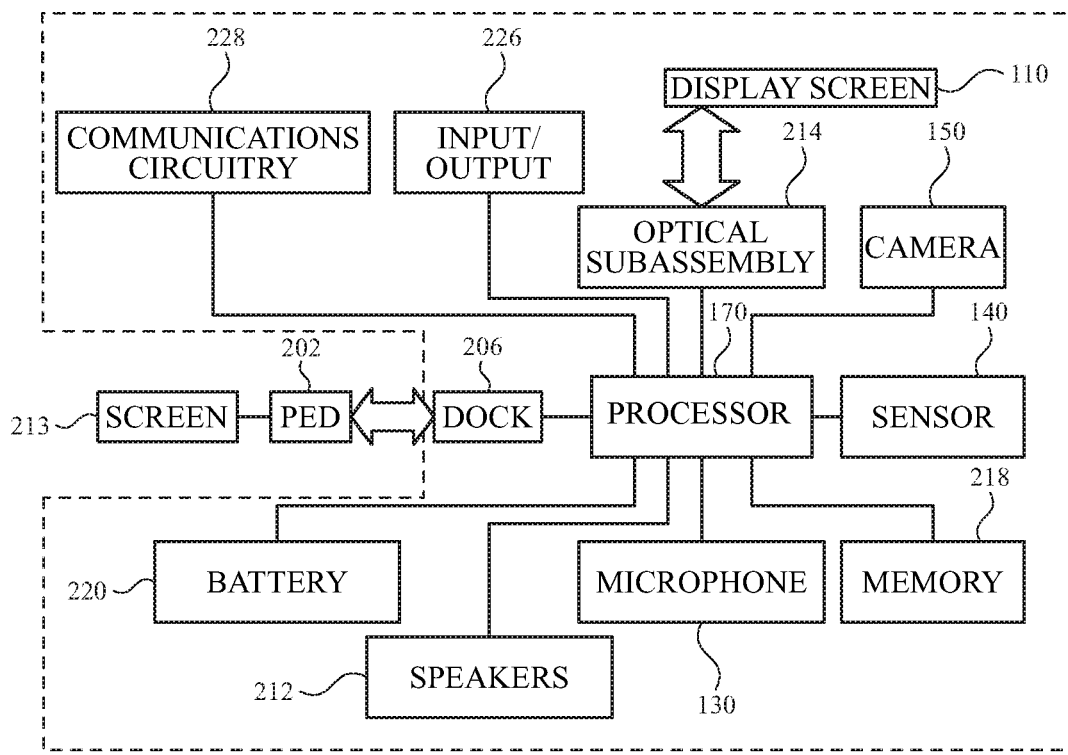
FIG. 4 illustrates a block diagram of a head-mounted device, in accordance with some embodiments of the present disclosure.

Referring now to FIG. 4, components of the head-mounted device can be operably connected to provide the performance described herein. FIG. 4 shows a simplified block diagram of an illustrative head-mounted device 100 in accordance with one embodiment of the invention. It will be appreciated that components described herein can be provided on either or both of a frame and/or a securement element of the head-mounted device 100.

As shown in FIG. 4, the head-mounted device 100 can include a processor 170 with one or more processing units that include or are configured to access a memory 218 having instructions stored thereon. The instructions or computer programs may be configured to perform one or more of the operations or functions described with respect to the head-mounted device 100. The processor 170 can be implemented as any electronic device capable of processing, receiving, or transmitting data or instructions. For example, the processor 170 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mounted device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mounted device 100 can further include a display 110 for displaying visual information for a user. The display 110 can provide visual (e.g., image or video) output. The display 110 can be or include an opaque, transparent, and/or translucent display. The display 110 may have a transparent or translucent medium through which light representative of images is directed to a user's eyes. The display 110 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mounted device 100 can include an optical subassembly 214 configured to help optically adjust and correctly project the image based content being displayed by the display 110 for close up viewing. The optical subassembly 214 can include one or more lenses, mirrors, or other optical devices.

The head-mounted device 100 can include a camera 150 for capturing a view of an environment external to the head-mounted device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or subject located within a field of view of the camera 150. The image may be stored in a digital file in accordance with any one of a number of digital formats. In some embodiments, the head-mounted device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mounted device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

The head-mounted device 100 can include one or more sensors 140 for tracking features of the user wearing the head-mounted device 100. For example, such sensors can perform facial feature detection, facial movement detection, facial recognition, eye tracking, user mood detection, user emotion detection, voice detection, etc. Such eye tracking may be used to determine a location of information to be displayed on the display 110.

Head-mounted device 100 can include a battery 220, which can charge and/or power components of the head-mounted device 100. The battery 220 can also charge and/or power components connected to the head-mounted device 100, such as a portable electronic device 202, as discussed further herein.

The head-mounted device 100 can include an input/output component 226, which can include any suitable component for connecting head-mounted device 100 to other devices. Suitable components can include, for example, audio/video jacks, data connectors, or any additional or alternative input/output components. The input/output component 226 can include buttons, keys, or another feature that can act as a keyboard for operation by the user. As such, the description herein relating to keyboards can apply to keyboards, keys, and/or other input features integrated on the head-mounted device 100. Such an input/output component 226 can be fixedly or removably attached to a main body of the head-mounted device 100.

The head-mounted device 100 can include communications circuitry 228 for communicating with one or more servers or other devices using any suitable communications protocol. For example, communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 228 can also include an antenna for transmitting and receiving electromagnetic signals.

The head-mounted device 100 can include the microphone 230 as described herein. The microphone 230 can be operably connected to the processor 170 for detection of sound levels and communication of detections for further processing, as described further herein.

The head-mounted device 100 can include the speakers 222 as described herein. The speakers 222 can be operably connected to the processor 170 for control of speaker output, including sound levels, as described further herein.

The head-mounted device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics.

The head-mounted device 100 can optionally connect to a portable electronic device 202, which can provide certain functions. For the sake of brevity, the portable electronic device 202 will not be described in detail in FIG. 4. It should be appreciated, however, that the portable electronic device 202 may be embodied in a variety of forms including a variety of features, all or some of which can be utilized by the head-mounted device 100 (e.g., input/output, controls, processing, battery, etc.). The portable electronic device 202 can provide a handheld form factor (e.g., small portable electronic device which is light weight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mounted device 100.

The head-mounted device 100 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mounted device 100. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mounted device 100.

Figure 5:
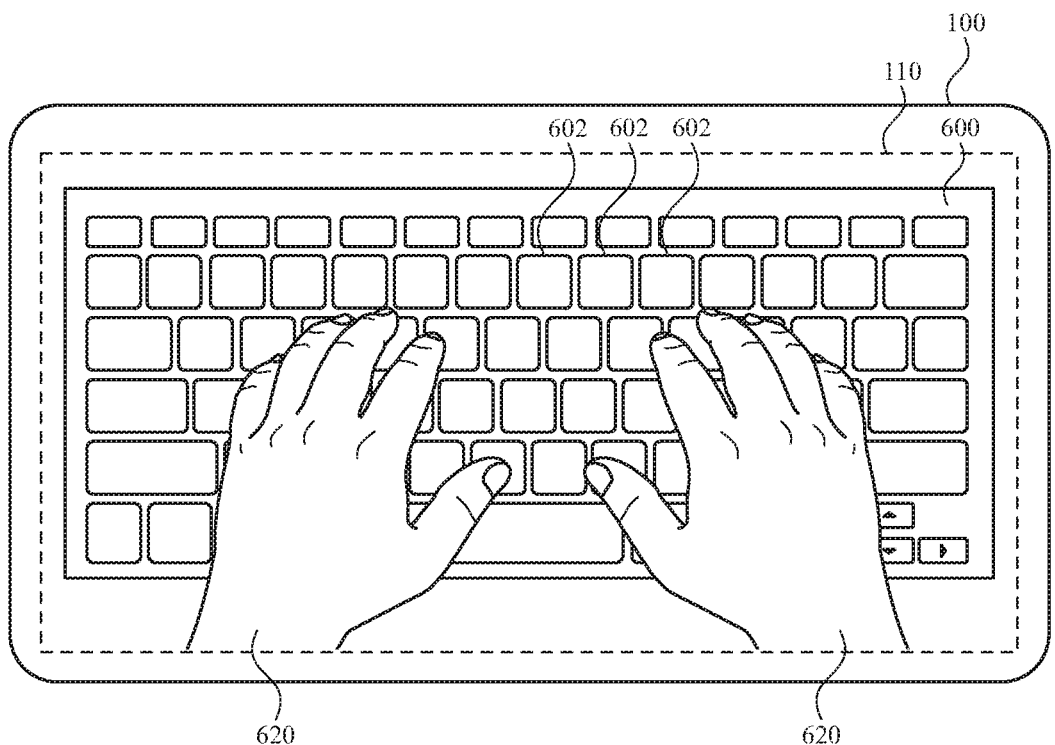
FIG. 5 illustrates a display of a head-mounted device providing a view of a keyboard and a user's hands, in accordance with some embodiments of the present disclosure.

Referring now to FIG. 5, the display 110 of the head-mounted device 100 can provide a view of the keyboard 600, keys 602 of the keyboard, and/or a user's hands 620. One or more of the objects provided in the view of the display 110 can correspond to physical objects in an environment. For example, a camera of the head-mounted device 100 can capture a view of a physical keyboard, its physical keys, and/or the hands of the user. Based on the captured view, the display 110 can provide a display that includes images of the physical objects. Additionally or alternatively, the display 110 can provide a display of virtual objects that correspond to physical objects in the external environment. For example, the keyboard 600, the keys 602, and/or the hands 620 can be rendered as virtual objects having features (e.g., position, orientation, color, size, etc.) that are based on detections of the physical objects in the external environment. Additionally or alternatively, the display 110 can provide a display of virtual objects that do not correspond to physical objects in the external environment. For example, the keyboard 600 and/or the keys 602 can be rendered as virtual objects even when no physical keyboard or keys are present. By further example, a virtual keyboard and/or virtual keys can be displayed by the display 110 as if projected onto a surface even when no actual projection is provided on the surface. Such a virtual keyboard and/or virtual keys can be observable only through the display 110. It will be recognized that the view can include a view of physical objects and virtual objects.

The hands 620 or portions thereof can be displayed with features that facilitate visibility thereof as well as visibility of other objects. For example, the hands 620 can be displayed (e.g., rendered) as semi-transparent (e.g., semi-opaque), such that portions of the keyboard 600 and/or the keys 602 can be viewed through the hands 620. Additionally or alternatively, portions of the hands 620 can be fully transparent, while other portions can be at least partially opaque, so that the transparent portions provide a view to underlying objects (e.g., keyboard 600 and/or the keys 602). The keyboard 600 and/or the keys 602 can be provided with highlighting, glowing, outlines, shadows, or other contrasting features that allow portions thereof to be more distinctly visible through the hands 620.

Figure 6:
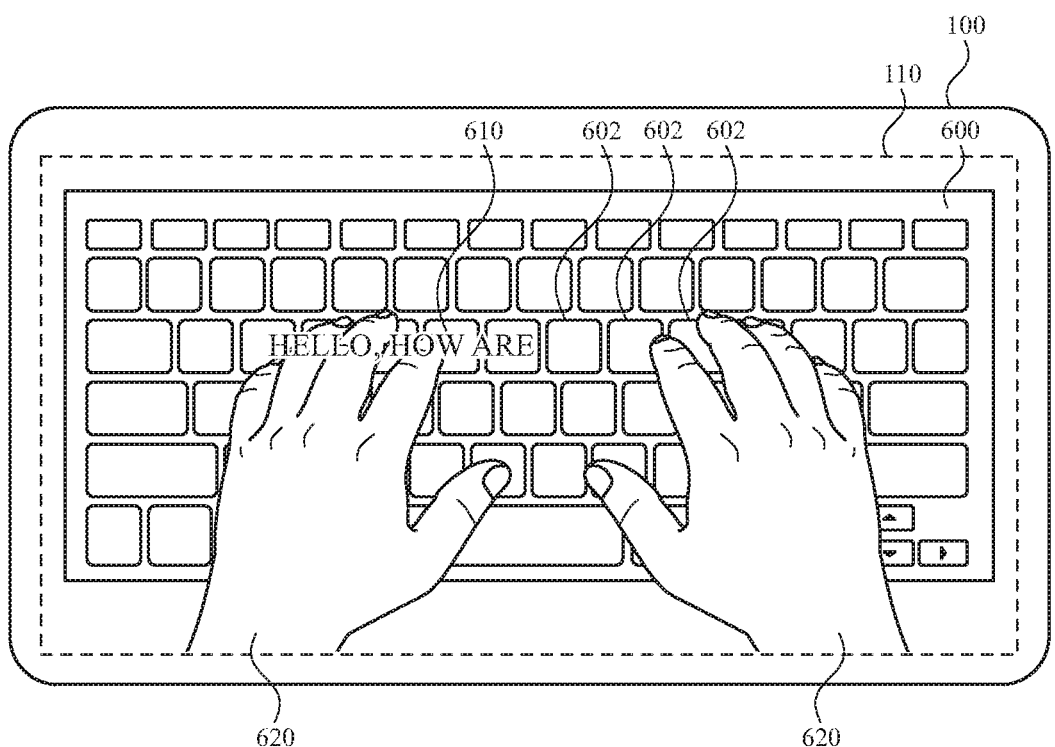
FIG. 6 illustrates a display of a head-mounted device providing a view of a keyboard, a user's hands, and text, in accordance with some embodiments of the present disclosure.

Referring now to FIG. 6, the user can operate the keyboard, for example, by pressing the keys of the keyboard in a sequence of selected characters to produce text. As discussed herein, the text can be detected by and/or communicated to the head-mounted device 100 and displayed on the display 110. As shown in FIG. 6, the text 610 can be displayed in a position and/or orientation that at least partially overlaps with the keyboard 600, the keys 602, and/or the hands 620. As such, the text 610 can be readily observed by user in close proximity to the implements (e.g., keys) that are used to produce the text. The user can then observe both the text and the implements simultaneously and/or in quick succession. Within a focused region of the user's gaze, the user can observe the keyboard for enhancing the accuracy of keyboard operation. Additionally, within the same focused region of the user's gaze, the user can observe the text to verify that the user has correctly operated the keyboard and as a referenced to acknowledge what has been typed previously. In this arrangement, the user can more easily observe the text while operating the keyboard, thereby avoiding the disruption of adjusting the user's gaze away from the keyboard to observe the text. Thus, the operation is more efficient and less disruptive to the user.

While the text 610 is shown in FIG. 6 as overlapping the keyboard 600, the keys 602, and the hands 620, it will be understood that the text 610 can be positioned and oriented such that only a portion thereof provide such overlap. Additionally or alternatively, the text 610 can be positioned and/or oriented such that the text 610 is provided in close proximity to, but not overlapping with, the keyboard 600, the keys 602, and/or the hands 620. The text 610 can be sized such that some or all of the text 610 fits within a region of the display 110 that overlaps the keyboard 600, the keys 602, and/or the hands 620.

The text 610 can be displayed with features that facilitate visibility thereof. For example, the text 610 can be displayed as semi-transparent (e.g., semi-opaque), such that portions of the keyboard 600, the keys 602, and/or the hands 620 can be viewed through the text 610. By further example, the text 610 can be provided with outline, shadows, or other contrasting features that allow it to be more distinctly visible when overlapping other objects. Additionally or alternatively, portions of the text 610 can be fully transparent, while other portions can be at least partially opaque, so that the transparent portions provide a view to underlying objects (e.g., keyboard 600, the keys 602, and/or the hands 620).

The position of the text 610 can be adjusted based on various factors. The text 610 can be maintained in a position that overlaps the keyboard even when the user moves in a way that causes the keyboard to be repositioned within the display region of the display 110. Thus, as the user moves, the text 610 can continue to be projected over the keyboard 600, the keys 602, and/or the hands 620. Additionally or alternatively, a gaze of the user can be detected with an eye-tracking device, and the text 610 can be moved to be within or near the gaze direction of the user's eyes.

Figure 7:
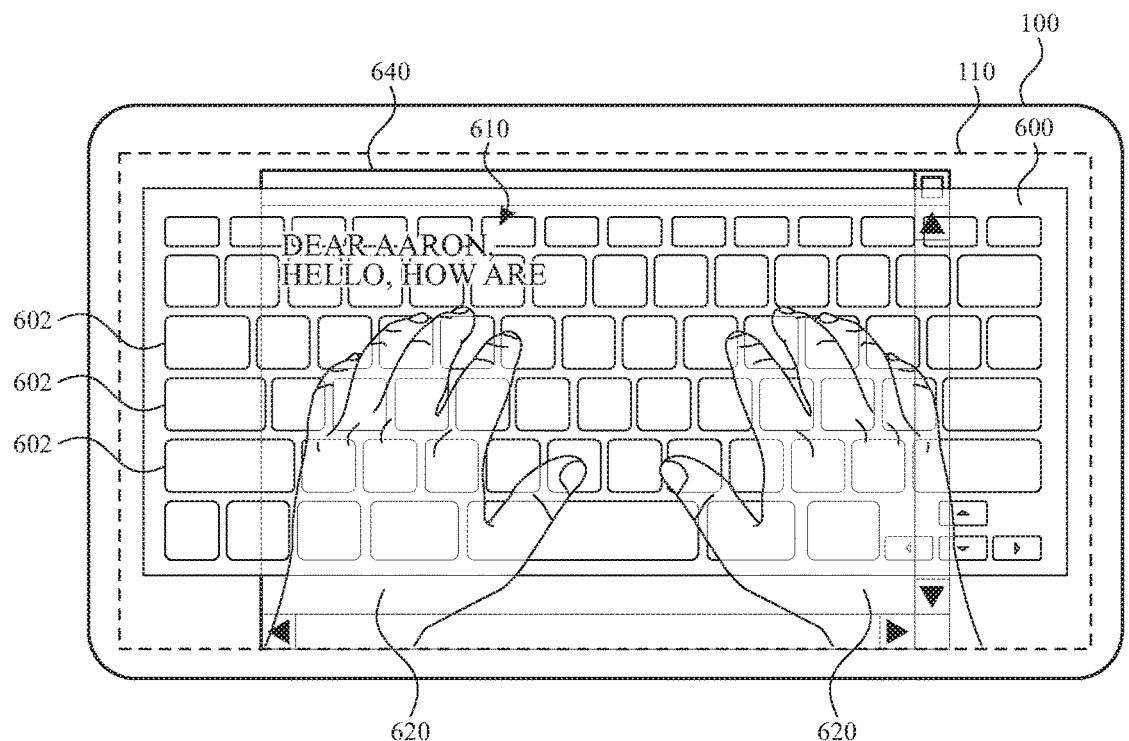
FIG. 7 illustrates a display of a head-mounted device providing a view of a keyboard, a user's hands, and text within a window, in accordance with some embodiments of the present disclosure.

Referring now to FIG. 7, the keyboard and/or the hands of the user can be displayed as overlapping the text that is produced by operation of the keyboard. For example, the text 610 can be provided within a window 640 displayed on the display 110. As shown in FIG. 7, the keyboard 600, the keys 602, and/or the hands 620 can be displayed in a position and/or orientation that at least partially overlaps with the text 610.

The keyboard 600, the keys 602, and/or the hands 620 can be displayed as semi-transparent (e.g., semi-opaque), such that portions of the window 640 and/or the text 610 can be viewed through the keyboard 600, the keys 602, and/or the hands 620. Additionally or alternatively, portions of the keyboard 600, the keys 602, and/or the hands 620 can be fully transparent, while other portions can be at least partially opaque, so that the transparent portions provide a view to underlying objects (e.g., the windows 640 and/or the text 610). As such, the text 610 can be readily observed by the user in close proximity to the implements used to produce the text.

Figure 8:
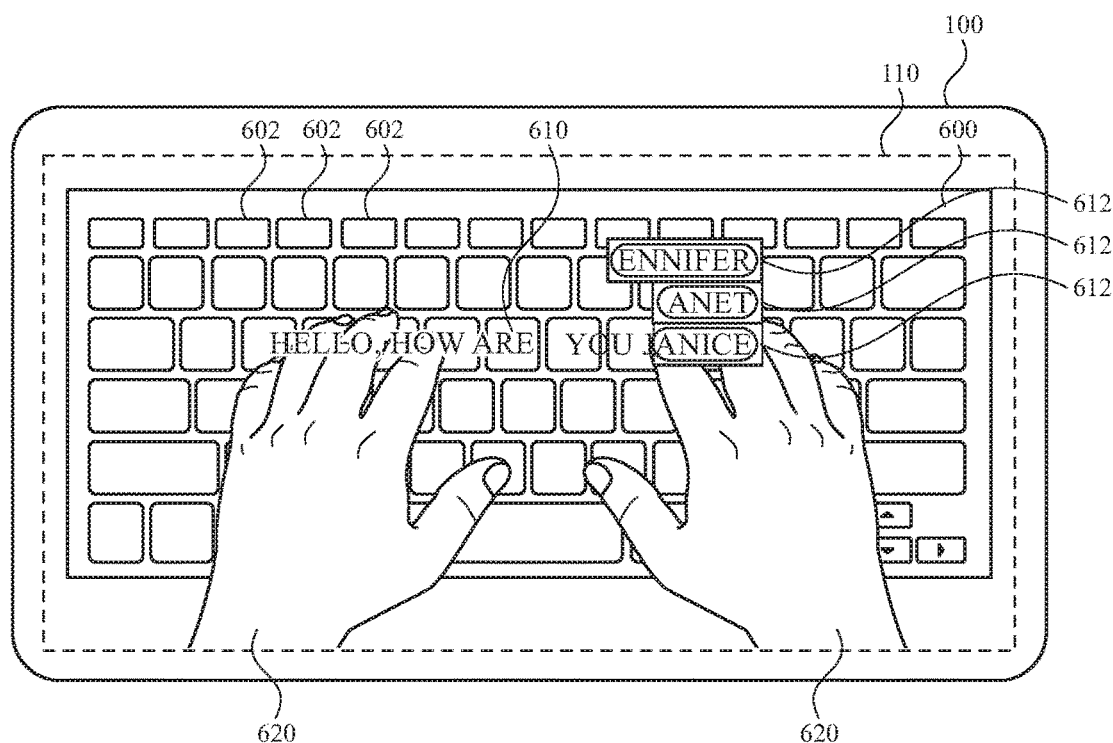
FIG. 8 illustrates a display of a head-mounted device providing a view of a keyboard, a user's hands, and text with available selections, in accordance with some embodiments of the present disclosure.

Referring now to FIG. 8, text can be provided on the display 110 along with other features for selection by a user. For example, as shown in FIG. 8, additional text 612 is provided adjacent to the original text 610. The additional text 612 can be based on the original text 610. For example, the additional text 612 can indicate suggested completions that, when combined with the original text 610, form a block of text. Such suggested completions can be based on historical text selection by the user, dictionaries, common usage among other users, and/or other sources that can be used to predict user inputs.

The user can interact with additional text 612 in one or more of a variety of ways. For example, the user can select one of multiple portions of the additional text 612. Inputs to make such a selection can include gestures with the hands 620 and/or other inputs that are detectable by and/or received by the head-mounted device 100. It will be recognized that other inputs for selection by a user can be received and processed, including tactile input with the head-mounted device, tactile input with another device, voice commands, eye movement, combinations thereof, and the like. Where multiple portions of additional text 612 are provided, the user can select one to be inserted as part of the original text 610. This allows the users to complete strings of text with fewer actions than would be required to type out each character on the keyboard 600. By further example, the user can provide gestures and/or other inputs to cycle through a selected one of the multiple portions of the additional text 612. Other gestures can confirm the selection and insert the selected text.

The additional text 612 can be displayed as overlapping the keyboard 600, the keys 602, and/or the hands 620. For example, the additional text 612 can appear as an extension of the original text 610. Additionally or alternatively, the additional text 612 can be displayed as not overlapping the keyboard 600, the keys 602, and/or the hands 620. As such, the additional text 612 can be more easily distinguished from the original text 610 and interacted with by the user in a region of the display 110 that is separate from the region containing the keyboard 600 and the keys 602.

Figure 9:
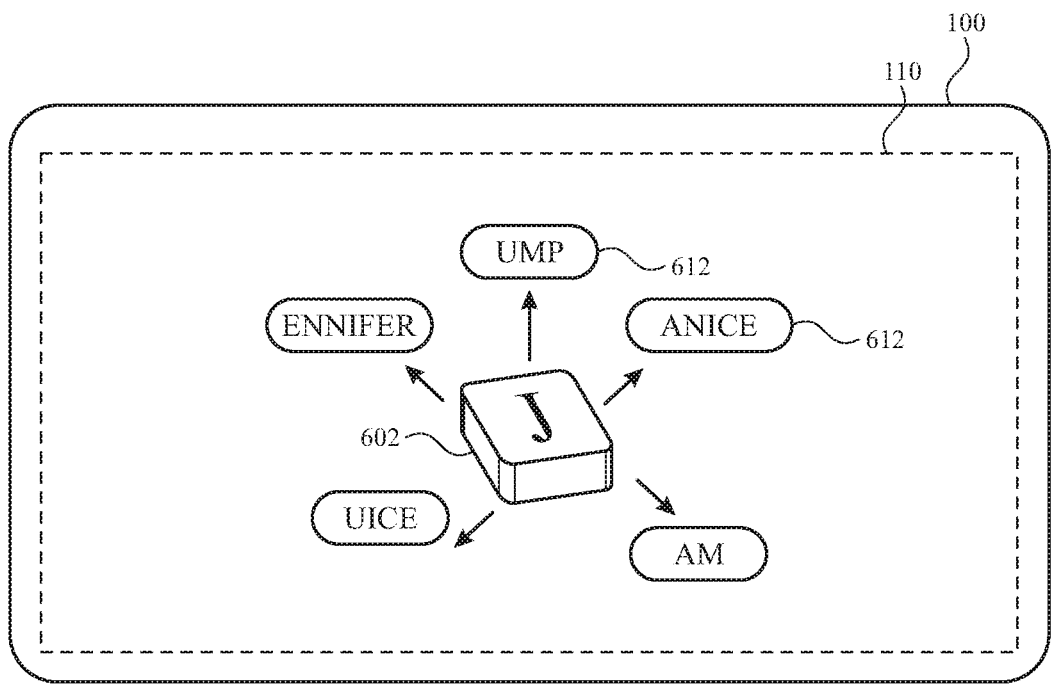
FIG. 9 illustrates a display of a head-mounted device providing a view of a key with available selections, in accordance with some embodiments of the present disclosure.

Referring now to FIG. 9, certain objects can be positioned adjacent to a selected one of the keys during operation of the keyboard. For example, as shown in FIG. 9, a selected one of the keys 602 can be operated by the user. Based on such operation, additional text 612 can be displayed.

The additional text 612 can be based on the selected one of the keys 602. For example, the additional text 612 can indicate suggested completions that, when combined with the character corresponding to the selected one of the keys 602, form a complete word, phrase, and/or sentence. Such suggested completions can be based on historical text selection by the user, dictionaries, common usage among other users, and/or other sources that can be used to predict user inputs.

The user can interact with additional text 612 in one or more of a variety of ways. For example, the user can select one of multiple portions of the additional text 612. Inputs to make such a selection can include gestures with the hands 620 and/or other inputs that are detectable by and/or received by the head-mounted device 100. It will be recognized that other inputs for selection by a user can be received and processed, including tactile input with the head-mounted device, tactile input with another device, voice commands, eye movement, combinations thereof, and the like. Where multiple portions of additional text 612 are provided, the user can select one to be combined with the character corresponding to the selected one of the keys 602. This allows the users to complete strings of text with fewer actions than would be required to type out each character on the keyboard.

The additional text 612 can be displayed adjacent to the selected one of the keys 602. As such, the additional text 612 can be more easily distinguished from the original text 610 and interacted with by the user in a region of the display 110 that is separate from the region containing the selected one of the keys 602. Additionally or alternatively, the additional text 612 can be displayed as overlapping the selected one of the keys 602. For example, the additional text 612 can appear as an extension of the selected one of the keys 602.

Figure 10:
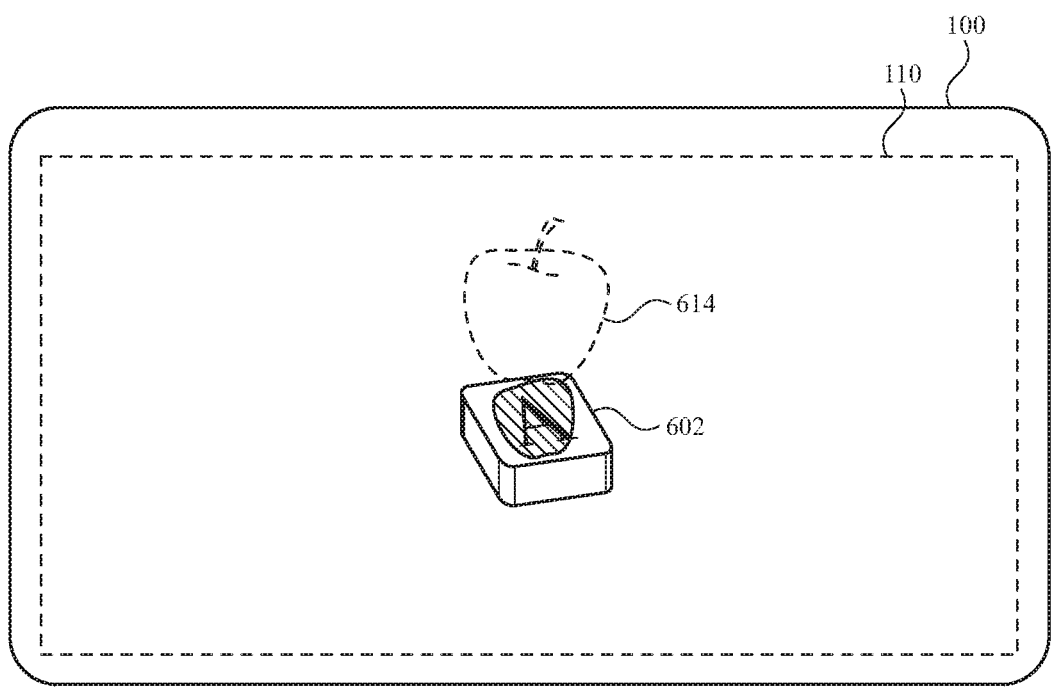
FIG. 10 illustrates a display of a head-mounted device providing a view of a key with a virtual object, in accordance with some embodiments of the present disclosure.

Referring now to FIG. 10, other objects can be positioned adjacent to a selected one of the keys during operation of the keyboard. For example, as shown in FIG. 9, a selected one of the keys 602 can be operated by the user. Based on such operation or other identification of a key 602, a virtual object 614 can be displayed. Such a virtual object 614 can include an icon, symbol, graphic, word, picture, or other visible feature that can be displayed. By further example, multiple keys 602 can each have a corresponding virtual object 614 displayed thereby. The virtual objects 614 can be different for different corresponding keys 602. The virtual objects 614 can be displayed before, during, and/or after operation of the corresponding keys 602 by the user. A virtual object 614 can be displayed adjacent to, near, and/or overlapping with the selected one of the keys 602.

The user can interact with virtual objects 614 in one or more of a variety of ways. For example, the user can select one of multiple virtual objects 614 to provide additional functions. Inputs to make such a selection can include gestures with the hands and/or other inputs that are detectable by and/or received by the head-mounted device 100. It will be recognized that other inputs for selection by a user can be received and processed, including tactile input with the head-mounted device, tactile input with another device, voice commands, eye movement, combinations thereof, and the like.

Figure 11:
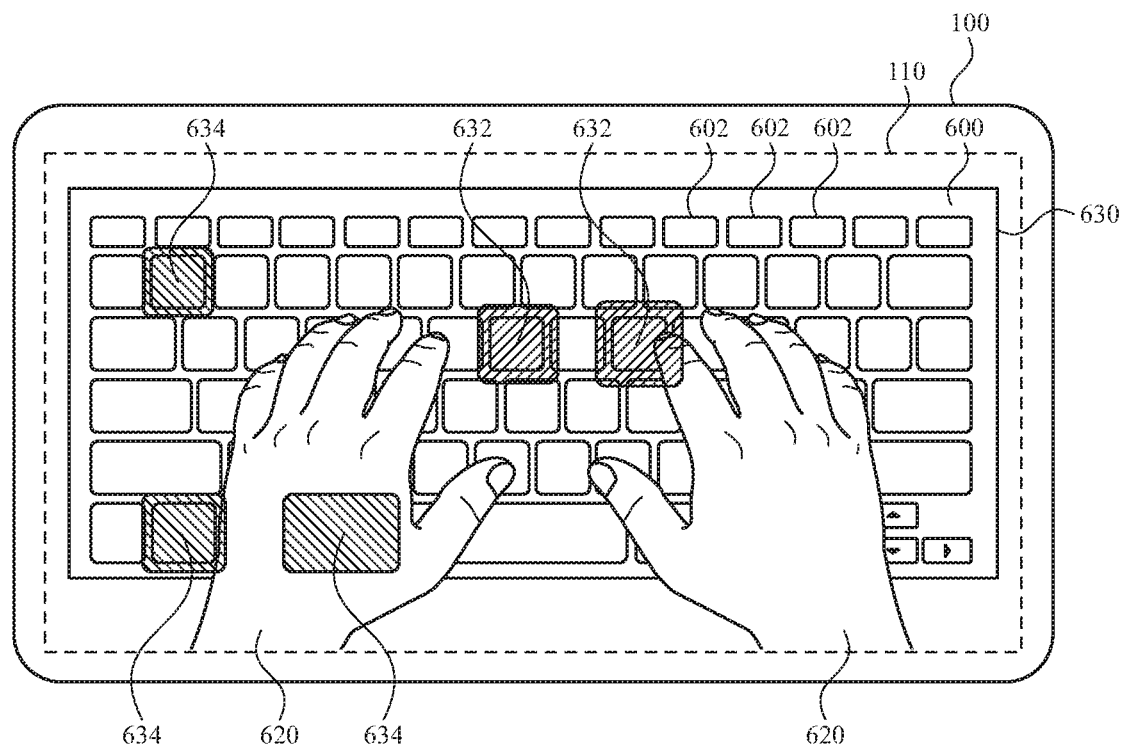
FIG. 11 illustrates a display of a head-mounted device providing a view of a keyboard, a user's hands, and virtual indicators, in accordance with some embodiments of the present disclosure.

Referring now to FIG. 11, a keyboard or other input device can be operated with a head-mounted device that displays virtual indicators relating to the user's operation of the keyboard. As shown in FIG. 11, the display 110 of the head-mounted device 100 can provide a view of the keyboard 600, the keys 602, and/or the user's hands 620. One or more virtual features can be provided to enhance the user's perceptions and observations of the keyboard 600. For example, a border indicator 630 can be provided about at least a portion of the view of the keyboard 600. The border indicator 630 can encompass and/or surround some or all of the keys 602. The border indicator 630 can provide the user with an easily discernible indicator of the location of the keyboard 600 and/or the keys 602 thereof. The border indicator 630 can be provided over or under the hands 620. The border indicator 630 can be displayed as semi-transparent (e.g., semi-opaque), such that portions of the keyboard 600, the keys 602, and/or the user's hands 620 can be viewed through the border indicator 630.

The display of the head-mounted device can provide a view of the indicators over and/or near the keys of the keyboard. As shown in FIG. 11, key indicators 632 can be provided based on the operation of the keys 602. For example, when a key 602 is pressed by the user's hand 620, the key indicators 632 can be provided at or near the key 602 that has been pressed. Such a key indicator 632 can be used to provide a confirmation to a user that a key press has been received. For example, a depiction of a virtual keyboard can be displayed with virtual keys that correspond to the physical keys of a corresponding physical keyboard. When the physical keys are operated, the virtual keys are animated to travel as do the physical keys. The virtual keys can have at least some features that are different from the physical keys. For example, the virtual keys can be taller than the physical keys, and the animated travel can be more exaggerated than the travel of the physical keys. This provides the user with a more prominent visual feedback and confirmation that the action was received. Additionally or alternatively, as a finger of a user's hand 620 approaches a key 602, a key indicator 632 can be provided at or near the corresponding key 602. One or more characteristics of the key indicator 632 can be based on the distance between the user's hand 620 and the corresponding key 602. A key indicator 632 can be dynamically updated based on a distance between the user's hands and the corresponding key. For example, a key indicator 632 can grow larger as the user's hand 620 approaches a corresponding key 602, and/or the key indicator 632 can grow smaller as the user's hand 620 moves away from the corresponding key 602. Other characteristics, such as shape, color, aspect ratio, and the like can also be altered based on the user's hands 620. The key indicator 632 can include an animation. The key indicator 632 can be displayed as semi-transparent (e.g., semi-opaque), such that portions of the keyboard 600, the keys 602, and/or the user's hands 620 can be viewed through the key indicator 632. The key indicator can include outputs other than visual outputs. For example, the indicator can include audio and/or haptic feedback. For example, a key press can result in the head-mounted device outputting a sound that corresponds to a familiar sound of a key press on a physical keyboard. It will be recognized that other sounds can also be provided by the head-mounted device upon operation of one or more keys. Sounds can be global or location specific. For example, sound output in response to operation of keys at different locations can be output according to the location of the corresponding key. By further example, operation of keys on one side (e.g., left or right) of the keyboard can result in sounds being emitted from a speaker on a corresponding side (e.g., left or right) of the head-mounted device. This can provide the user with more spatial awareness of the actions being detected by the system.

Additionally or alternatively, key indicators can be provided prior to or otherwise independent of the user's actions. As further shown in FIG. 11, key indicators 634 can be provided to guide a user to one or more keys 602. For example, the head-mounted device can indicate a suggested keystroke and/or combination of keystrokes by providing the key indicators 634 at or near the corresponding keys. Such key indicators can be provided as part of a tutorial or troubleshooting operation. As such, they may be provided prior to operation of the corresponding keys by the user. Such key indicators can be removed from view when the corresponding keystroke and/or combination of keystrokes are performed by the user. The key indicator 634 can include an animation. The key indicator 634 can be displayed as semi-transparent (e.g., semi-opaque), such that portions of the keyboard 600, the keys 602, and/or the user's hands 620 can be viewed through the key indicator 634.

Additionally or alternatively, other indicators can be provided based on further inputs from a user. For example, one or more keys and/or text can be highlighted or otherwise modified based on typing, gestures, and/or eye movement of the user.

Figure 12:
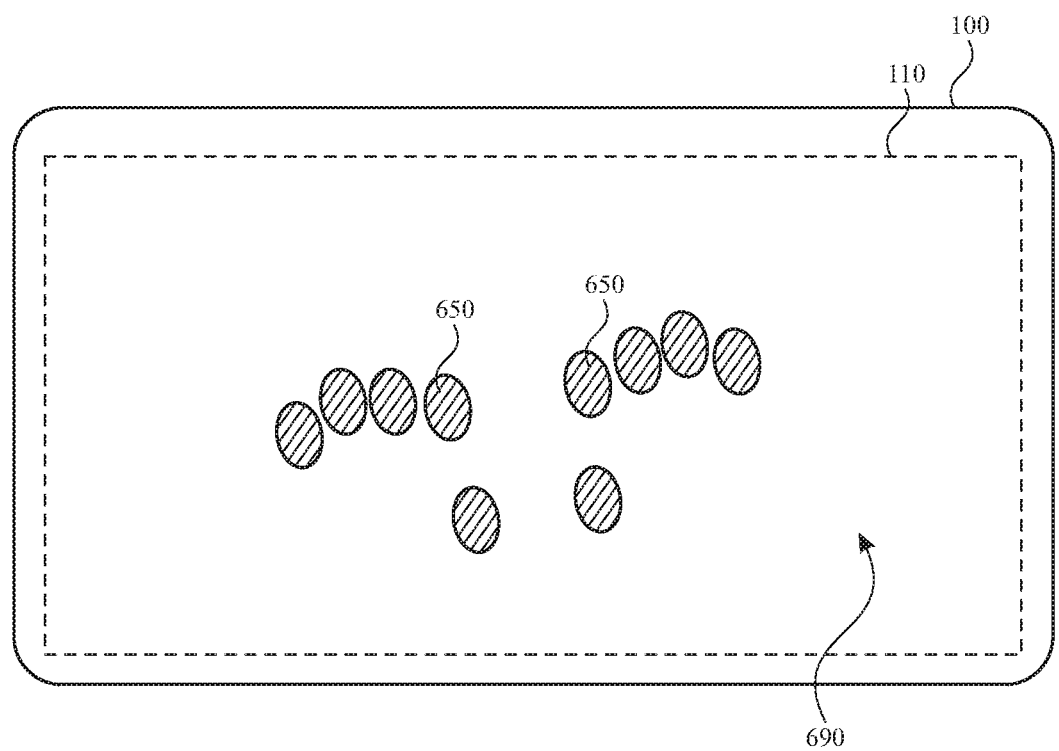
FIG. 12 illustrates a display of a head-mounted device providing a view of a user's hands with respect to a surface, in accordance with some embodiments of the present disclosure.
Figure 13:
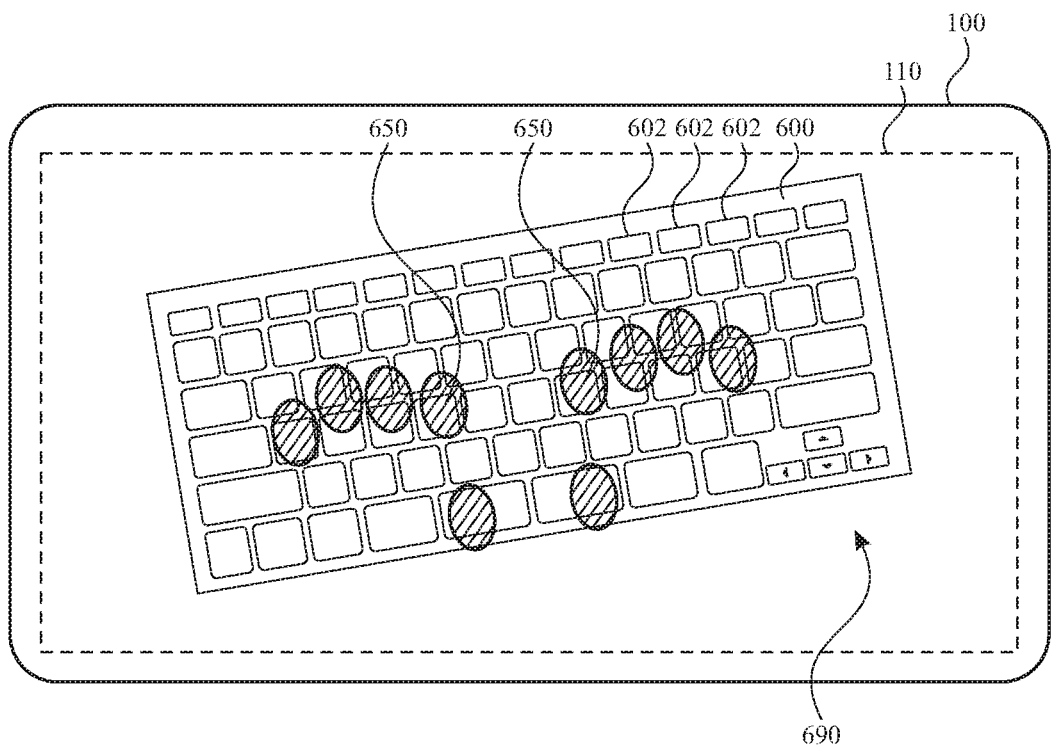
FIG. 13 illustrates a display of a head-mounted device providing a view of a keyboard having an arrangement based on a position of a user's hands, in accordance with some embodiments of the present disclosure.

Referring now to FIGS. 12 and 13, a head-mounted device can provide a virtual keyboard based on the arrangement of the user's hands with respect to a surface. As shown in FIG. 12, the display 110 of the head-mounted device 100 can provide a view of a surface 690. The surface 690 can be any surface, including the surface of an input device or any surface that is within reach of the user. Accordingly, the user can place hands on the surface 690, and the head-mounted device can detect the position and/or orientation of the hands on the surface 690. Such a detection can be performed during an initial (e.g., setup) stage of operation. Such an initial stage of operation can be user-selected or automatically detected. The positions 650 of the user's hands can correspond to a natural, relaxed position of the hands, such that the user feels comfortable in such an arrangement. The positions 650 can each correspond to a point of contact between one or more of the fingers of the hands and the surface 690.

As shown in FIG. 13, the display 110 of the head-mounted device 100 can provide a view of a keyboard 600 having keys 602. The keyboard 600 can be displayed as a projection onto the surface 690. The position, size, orientation, and/or other characteristics of the keyboard 600 and/or the keys 602 can be based on the positions 650 of the hands of the user on the surface 690 at least during the initial stage described above. For example, the keyboard 600 can have a position, size, and/or orientation that places a selected set of the keys at or near the positions 650 of the hands. For example, the keyboard 600 can be arranged so that certain keys 602 are located at a rest position of the hands (e.g., "a", "s", "d", "f", and space bar for the left hand and "j", "k", "l", ";", and space bar for the right hand). After the initial stage, the keyboard 600 can maintain the arrangement with respect to the surface 690 even after the user's hands start moving (e.g., to operate the keyboard). The user can be provided with operation to manually adjust the keyboard as desired. Additionally or alternatively, the head-mounted device can prompt the user to adjust a hand position or reposition the keyboard 600. For example, if the positions 650 of the hands of the user on the surface 690 do not align with the positions of the keys 602 (e.g., certain keys 602 are no longer located at a rest position of the hands), then the head-mounted device can provide an output (e.g., visual, auditory, and/or the like) to urge the user to adjust the positions 650 of the hands of the user on the surface 690. By further example, if the positions 650 of the hands of the user on the surface 690 do not align with the positions of the keys 602, then the head-mounted device can automatically adjust the positions of the keys 602 and/or prompt a user to approve adjustment of the positions of the keys 602. The keyboard 600 and/or the keys 602 can be displayed as semi-transparent (e.g., semi-opaque), such that portions of the user's hands 620 and/or the surface 690 can be viewed through the keyboard 600 and/or the keys 602.

In some embodiments, the head-mounted device can verify a user input based on the positions 650 of the hands. For example, if the positions 650 of the hands of the user on the surface 690 do not align with the positions of the keys 602 during input (e.g., if the user provides an input far from the center of a key 602 or between different keys), then the head-mounted device can provide an output (e.g., visual, auditory, and/or the like) to urge the user to adjust the positions 650 of the hands of the user on the surface 690. By further example, if the positions 650 of the hands of the user on the surface 690 do not align with the positions of the keys 602 during input, then the head-mounted device can automatically correct the inputs to correspond to an intended input. Such intended inputs can be verified by comparing a received input (e.g., spelling of a word) with a proposed input (e.g., dictionary of correctly spelled words). The head-mounted device can automatically correct inputs and/or prompt a user to approve a correction to the input.

It will be recognized that any aspects of the keyboard 600 can be selected when projected. For example, a language and/or keyset can be selected so that each key has a character based on a selected alphabet and/or other ruleset. Aesthetic features, such as color, can also be selected. Certain features can be selected for optimal display against the surface. For example, a color that contrasts with a color of the surface can be selected. Such features can be automatically or user selected.

Figure 14:
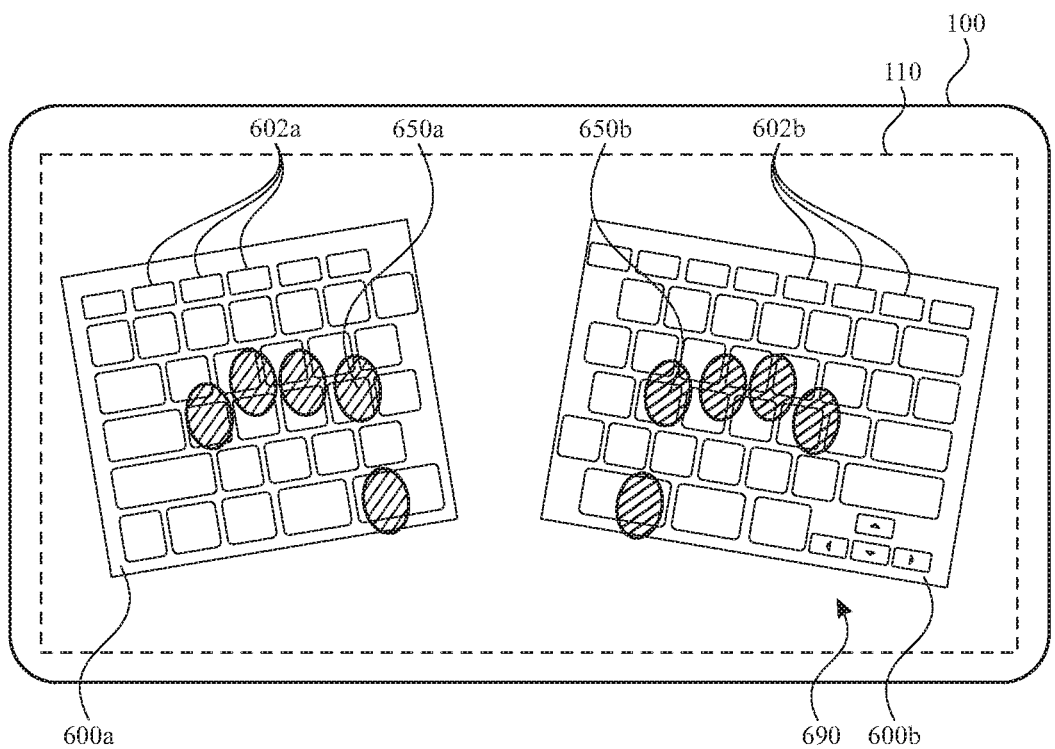
FIG. 14 illustrates a display of a head-mounted device providing a view of keyboard portions having an arrangement based on a position of a user's hands, in accordance with some embodiments of the present disclosure.

Referring now to FIG. 14, the keyboard can be split into multiple portions to provide more accurate alignment with each of the users to hands. For example, as shown in FIG. 14, the positions detected for the users hands can include left positions 650a and right positions 650b. The left positions 650a can correspond to points of contact between fingers of the left hand and the surface 690, and right positions 650b can correspond to points of contact between the right hand and the surface 690. The display 110 of the head-mounted device 100 can provide a view of a left keyboard portion 600a having left keys 602a and a right keyboard portion 600b having right keys 602b. The left keyboard portion 600a and the right keyboard portion 600b can be displayed as projections onto the surface 690. The position, size, orientation, and/or other characteristics of each of the left keyboard portion 600a and the right keyboard portion 600b can be based on the left positions 650a and right positions 650b of the corresponding hands of the user on the surface 690 at least during the initial stage described above. For example, the head-mounted device 100 can determine the position, size, and/or orientation of each portion independent of the other, so that each portion best fits based on the corresponding hand positions. After the initial stage, the left keyboard portion 600a and the right keyboard portion 600b can maintain the arrangements thereof with respect to the surface 690 even after the user's hands start moving (e.g., to operate the keyboard). The user can be provided with operation to manually adjust the keyboard as desired. The left keyboard portion 600a and/or the right keyboard portion 600b can be displayed as semi-transparent (e.g., semi-opaque), such that portions of the user's hands 620 and/or the surface 690 can be viewed through the left keyboard portion 600a and/or the right keyboard portion 600b as well as the keys thereof.

While some examples described herein are directed to input with a keyboard, it will be understood that other input mechanisms are within the scope of this description. For example, handwriting (e.g., with a finger, a stylus, or another device) and drawing can be received and interpreted based on input from a user (e.g., with a user's hands). Where such user gestures and/or instrument operation involve the determination of text, the resulting text can be displayed as described herein. For example, such text can be displayed as overlapping and/or near the user's hands, a writing surface, and/or any instrument (e.g., stylus) that is in use.

Combinations of multiple input mechanisms can be employed. For example, a user can operate in instrument, a surface, or other implement to simulate operation of keys on a keyboard and/or handwriting (e.g., with a finger, a stylus, or another device) on the same instrument, surface, or other implement. For example, in certain alphabets a can be beneficial to offer a user with an ability to provide phonetic inputs as with a keyboard and to draw intricate characters by gestures that follow a path that traces the corresponding script. The head-mounted device, alone or in concert with another device, can detect and interpret different gestures as being one or another type of user input and interpret accordingly. For example, the head-mounted device, a physical keyboard, and/or an external device can detect a user's keyboard based gestures, and a head-mounted device, and/or an external device can detect a user's handwriting-based gestures.

Accordingly, embodiments of the present disclosure provide a head-mounted device with enhanced operation of a keyboard, another input device, and/or any surface. The head-mounted device can display feedback, outputs, or other features based on the user's actions. For example, the head-mounted device can display text generated by the user's operation of the keyboard. The text can be displayed in a manner that allows a user to readily see the keyboard, the user's hands, and the text that is generated by operation of the keyboard. The head-mounted device can further display features that facilitate the user's operation of the keyboard. For example, suggested text, keystrokes, or other features correlated with keys of the keyboard can be displayed for selection by a user. By further example, the keyboard can be displayed in a position and orientation that conforms to an arrangement of the user's hands within a field of view of the head-mounted device.

Various examples of aspects of the disclosure are described below as clauses for convenience. These are provided as examples, and do not limit the subject technology.

Clause A: a head-mounted device comprising: a display configured to display: a keyboard having keys; and a position of a user's hands with respect to the keyboard; and a processor configured to detect which of the keys of the keyboard are operated by the user's hands, the display being further configured to display, based on operation of the keys, text in a position that overlaps the keyboard.

Clause B: a head-mounted device comprising: a camera configured to capture a view of a keyboard having keys that are operable by a user's hands; a processor configured to detect when a selected one of the keys is operated; and a display configured to display: the keys of the keyboard; and a virtual indicator positioned at the selected one of the keys in response to the selected one of the keys being operated.

Clause C: a head-mounted device comprising: a camera configured to capture a view of a surface and a user's hands; a display configured to display a view of: the surface; the user's hands; and a virtual keyboard in a position that overlaps the surface; and a processor configured to: detect, during an initial stage, a position of the user's hands while contacting the surface; and direct the display to display the virtual keyboard on the surface and at the position of the user's hands.

One or more of the above clauses can include one or more of the features described below. It is noted that any of the following clauses may be combined in any combination with each other, and placed into a respective independent clause, e.g., clause A, B, or C.

Clause 1: the keyboard is a physical keyboard and the head-mounted device further comprises a camera configured to capture a view of the keyboard and the user's hands.

Clause 2: the processor is configured to detect which of the keys of the keyboard are operated by the user's hands based on the view captured by the camera.

Clause 3: a communication component configured to receive a signal from the keyboard based on the operation of the keys.

Clause 4: the keyboard is a virtual keyboard.

Clause 5: the text is displayed as semi-transparent, such that a portion of the keyboard is visible through the text.

Clause 6: the keyboard is displayed as semi-transparent, such that a portion of the text is visible through the keyboard.

Clause 7: the text is a first text and the display module is further configured to display, adjacent to the first text, a second text that is based on the first text.

Clause 8: the processor is configured to detect a user input indicating a selection of the second text and the display module is configured to display, based on the selection, the first text and the second text in the position that overlaps the keyboard.

Clause 9: the virtual indicator is an animation.

Clause 10: the virtual indicator is a first virtual indicator and the display module is further configured to display a second virtual indicator positioned at another one of the keys that, when operated by the user, causes the head-mounted device to perform a predetermined action.

Clause 11: the virtual indicator is a first virtual indicator and the display module is further configured to display a second virtual indicator positioned at another one of the keys when the user's hands are within a predetermined distance of the other one of the keys.

Clause 12: a characteristic of the second virtual indicator is dynamically updated based on a distance between the user's hands and the other one of the keys.

Clause 13: the virtual indicator is a first virtual indicator and the display module is further configured to display a second virtual indicator surrounding all of the keys of the keyboard.

Clause 14: a size, a position, and an orientation of the virtual keyboard on the surface is selected such that some keys of the virtual keyboard are each aligned with a corresponding finger of the user's hands during the initial stage.

Clause 15: the user's hands include a left hand and a right hand, and the virtual keyboard comprises a left keyboard portion displayed under a position of the left hand during the initial stage and a right keyboard portion displayed under a position of the right hand during the initial stage.

Clause 16: after the initial stage, the display module is further configured to maintain the virtual keyboard where the user's hands were located during the initial stage.

Clause 17: the surface is a surface of an input device that is configured to provide haptic feedback in response to a force applied by the user's hands.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mounted device comprising:
   a display configured to display:
      a keyboard having keys; and
      a position of a user's hands with respect to the keyboard; and
   a processor configured to:
      detect when a selected one of the keys of the keyboard is operated by the user's hands, the display being further configured to display, based on operation of the keys, portions of text in positions that overlap at least one of the keys and surround the selected one of the keys;
      detect when one of the portions of text is selected by the user; and
      perform a predetermined action in response to the one of the portions of text being selected by the user.

2. The head-mounted device of claim 1, wherein the keyboard is a physical keyboard and the head-mounted device further comprises a camera configured to capture a view of the keyboard and the user's hands.

3. The head-mounted device of claim 2, wherein the processor is configured to detect which of the keys of the keyboard are operated by the user's hands based on the view captured by the camera.

4. The head-mounted device of claim 2, further comprising a communication component configured to receive a signal from the keyboard based on the operation of the keys.

5. The head-mounted device of claim 1, wherein the keyboard is a virtual keyboard.

6. The head-mounted device of claim 1, wherein the text is displayed as semi-transparent, such that a portion of the keyboard is visible through the text.

7. The head-mounted device of claim 1, wherein the keyboard is displayed as semi-transparent, such that a portion of the text is visible through the keyboard.

8. The head-mounted device of claim 1, wherein the text is a first text and the display is further configured to display, adjacent to the first text, a second text that is based on the first text.

9. The head-mounted device of claim 8, wherein the processor is configured to detect a user input indicating a selection of the second text and the display is configured to display, based on the selection, the first text and the second text in the position that overlaps at least one of the keys.

10. A head-mounted device comprising:
    a camera configured to capture a view of a keyboard having keys that are operable by a user's hands;
    a processor configured to detect when a key of the keyboard is operated; and
    a display configured to display:
       the keys of the keyboard; and
       multiple virtual indicators, each of the multiple virtual indicators being positioned at a corresponding location on one of opposing sides of the key in response to the key being operated;
    the processor being further configured to:
       detect when one of the multiple virtual indicators is selected by the user; and
       perform a predetermined action in response to the one of the multiple virtual indicators being selected by the user.

11. The head-mounted device of claim 10, wherein at least one of the virtual indicators is an animation.

12. The head-mounted device of claim 10, wherein each of the virtual indicators comprises text.

13. The head-mounted device of claim 10, wherein a characteristic of the one of the virtual indicators is dynamically updated based on a distance between the user's hands and the one of the multiple virtual indicators.

14. A head-mounted device comprising:
    a camera configured to capture a view of a keyboard having keys that are operable by a user's hands;
    a processor configured to detect when a key of the keyboard is operated; and
    a display configured to display:
       the keys of the keyboard;
       first text in a position that overlaps at least one of the keys and displayed in response to operation of the key; and portions of second text, each of the portions of second text being positioned on a different side of the key and being displayed in response to operation of the key;

the processor being further configured to:
  detect when one of the portions of second text is selected by the user; and
  perform a predetermined action in response to the one of the portions of second text being selected by the user.

15. The head-mounted device of claim 14, wherein the one of the portions of second text is selected by a gesture with the user's hands.

16. The head-mounted device of claim 14, wherein a characteristic of the second text is dynamically updated based on a distance between the user's hands and the other one of the keys.

* * * * *